United States Patent Office 2,770,861
Patented Nov. 20, 1956

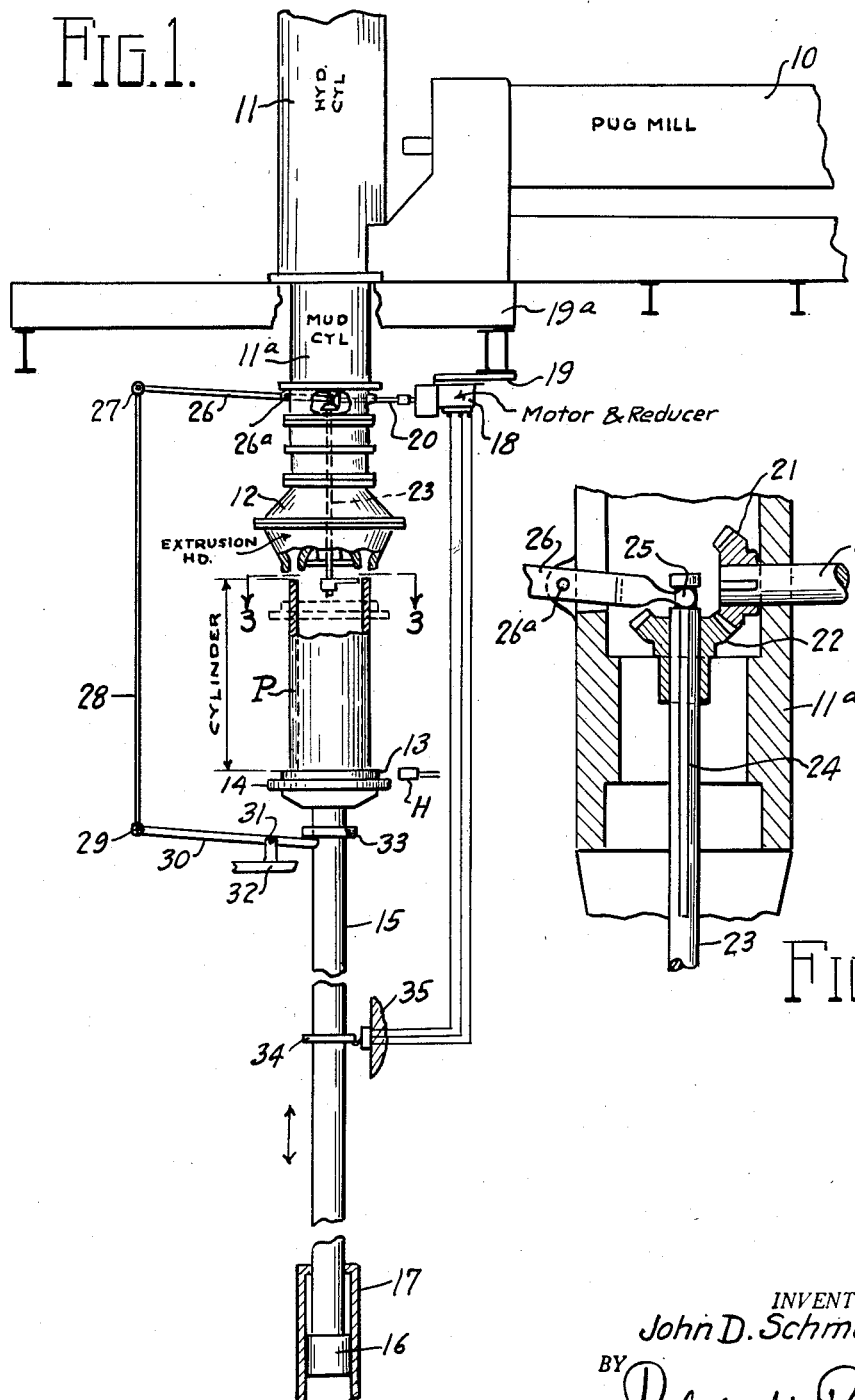

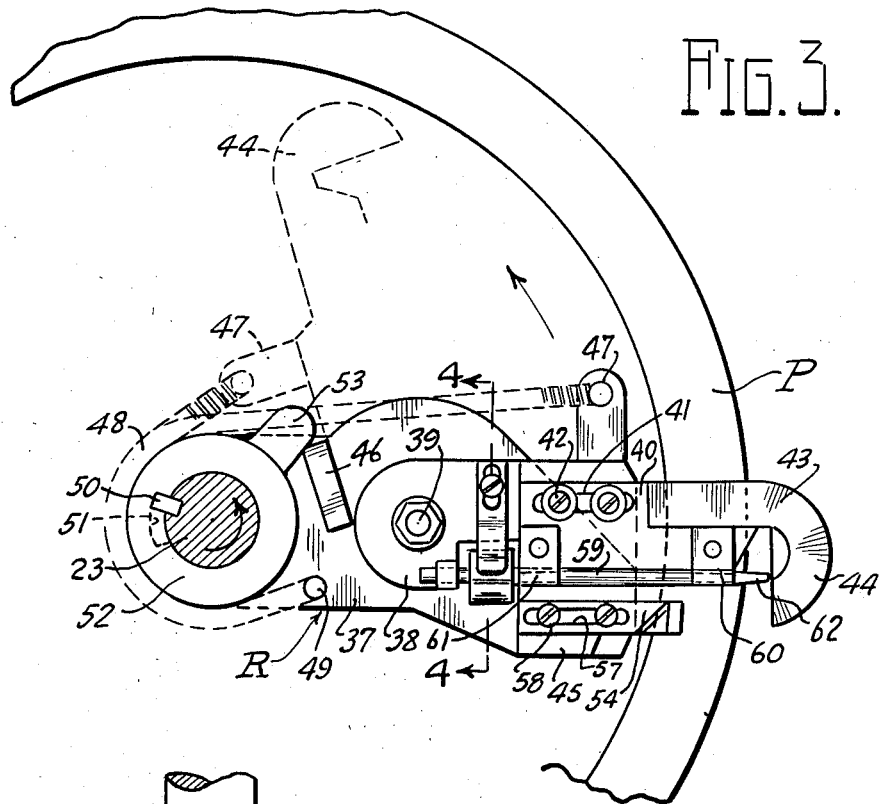
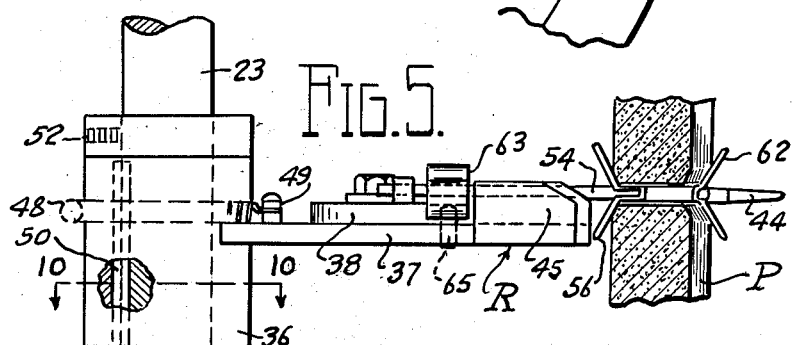
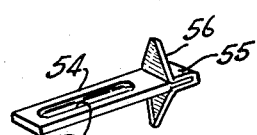
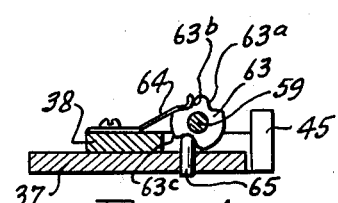

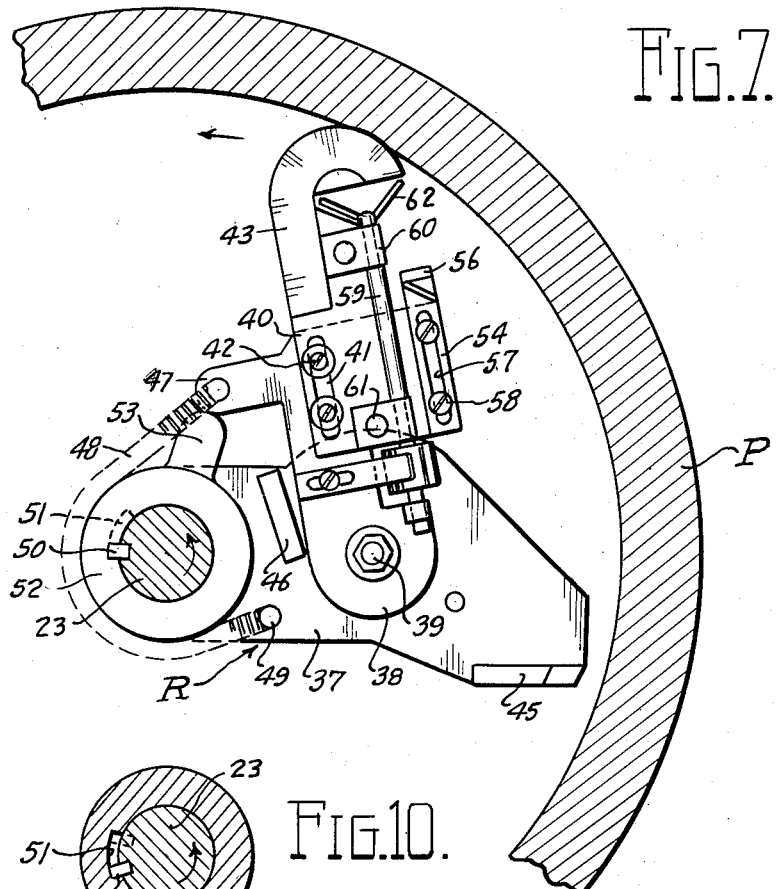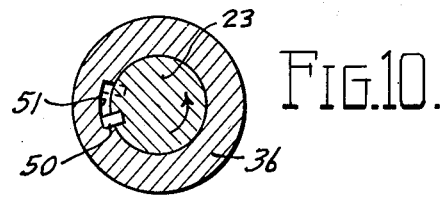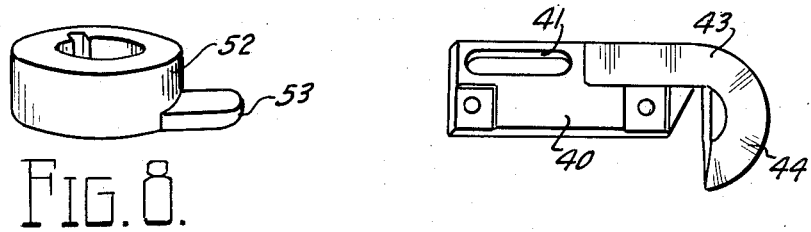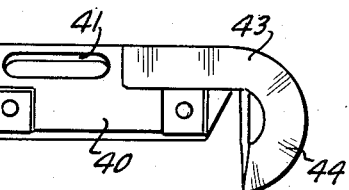
INVENTOR.
John D. Schmunk
ATTORNEY

2,770,861

APPARATUS FOR FORMING CYLINDERS OF PLASTIC MATERIAL

John D. Schmunk, Findlay, Ohio, assignor to The Hancock Brick and Tile Company, Findlay, Ohio, a corporation of Ohio Application September 16, 1952, Serial No. 309,799

7 Claims. (Cl. 25—39)

This invention relates to the manufacture or production of clay tubes or cylinders, particularly those of relatively large diameters, and an object is to produce a new and improved machine for the continuous automatic production of severed sections of predetermined length.

Another object is to produce a simple and efficient severing mechanism which is automatically rendered operative after the desired length of pipe has been produced, quickly severs the section, and then remains idle until another length has been formed, whereupon the severing mechanism is automatically rendered operative.

A further object of the invention is to produce a new and improved knife and rimmer mechanism by which a plastic cylinder section is severed from a continuous length thereof, and at the same time is beveled or chamfered both on the inside and outside edges of the severed tube section and also the oncoming tube end.

Other objects and advantages of the invention will hereinafter appear, and for purposes of illsutration but not of limitation, an embodiment of the invention is shown on the accompanying drawings, in which Figure 1 is a diagrammatic view in elevation and partly in section showing a machine for producing a continuous length of clay tube or cylinder and severing therefrom a predetermined section;

Figure 2 is an enlarged fragmentary vertical sectional view showing the drive connection for rotating the combined cylinder severing knife and edge rimmers;

Figure 3 is a top plan view of the combined knife and edge rimmers in operative position after the plastic cylinder has been severed;

Figure 4 is a transverse sectional view on the line 4—4 of Figure 3, showing the mechanism for oscillating the outside rimmer tool;

Figure 5 is a fragmentary side elevation of the combined knife and rimmer tools in working position;

Figure 6 is a perspective view of the inner rimmer tool;

Figure 7 is somewhat similar to Figure 3, showing a top plan view of the combined knife and rimmer mechanism with the knife as it is brought into engagement with the inner wall of the cylinder to commence the cutting operation;

Figure 8 is a perspective view of the collar having a cam finger which initiates the outward swinging movement of the combined knife and rimmer;

Figure 9 is a perspective view of the cylinder severing knife; and

Figure 10 is a transverse sectional view on the line 10—10 of Figure 5, showing the lost motion connection between the cam collar and the drive shaft.

The illustrated embodiment of the invention comprises a pug mill 10 in which suitable proportions of clay and water are mixed and from which the mixture is forced or extruded to a vertically disposed hydraulic cylinder 11 in which a piston (not shown) operates to force the mud therein downwardly through a mud cylinder 11a through an extrusion head 12 to form a continuous tube or cylinder P, the lower end of which rests upon a removable pallet 13 supported by a platform 14. The platform 14 is carried by a vertically elongate piston rod 15 which has a piston 16 at its lower end reciprocable within an air cylinder 17. Preferably a pressure chamber (not shown) is associated with the lower end of the cylinder 17 so that as the piston 16 moves downwardly under the weight of the cylinder P, such weight is counterbalanced substantially by the air within the pressure chamber. The arrangement is such that when the section severed from the cylinder P along with its pallet 13, is forced laterally by a ram H from the platform 14 to a suitable conveyor, for example, the latter is elevated by air pressure beneath the piston 16 so that another pallet placed on the platform 14 is positioned to receive the lower end of the oncoming cylinder. In this manner, the process is a continuous one and as soon as one cylinder section has been severed and forced from the platform 14 along with its pallet, a new cylinder section is being formed and after its length has been properly predetermined, the upper end is severed and the new pipe section P and its pallet are forced from the platform.

A motor and reducer 18 are suspended by a suitable bracket 19 from supporting framework 19a and are connected by a transverse drive shaft 20 to a horizontally disposed bevel gear 21 disposed within the mud cylinder 11a. The bevel gear 21 meshes with a bevel gear 22 suitably journaled within the cylinder 11a. The bevel gear 22 is mounted on a vertical drive shaft 23 for driving the combined cutter and rimmer mechanism R carried at the lower end of the shaft 23. The shaft 23 has an elongate connection 24 with the hub of the bevel gear 22 so that the shaft may move up and down relatively to the gear while the latter drives it. The upper end of the shaft 23 above the bevel gear 22 has a universal connection 25 with a horizontal lever 26 which extends through a slot in the cylinder 11a and is fulcrumed at 26a on a bracket on the outside of the forming cylinder. The outer end of the lever 26 is pivotally connected at 27 to a vertical link 28, the lower end of which is pivotally connected at 29 to a horizontal lever 30 fulcrumed at 31 to a suitable support 32. The inner end of the lever 30 is disposed beneath an adjustable collar 33 which is secured to the piston rod 15 for movement therewith.

Also mounted on the piston rod 15 below the collar 33 is a collar 34 which is adapted to engage a switch mechanism 35 for energizing the electric motor 18. The collar 34 is spaced below the collar 33 the distance desired for the length of the severed cylinder section. The switch mechanism 35 is of any suitable type for energizing the motor 18 for a period of time sufficient for the knife and rimmer mechanism to make approximately one and a half revolutions, the purpose of which will be hereinafter described.

In operation, it will be understood that a pallet 13 is first placed upon the platform 14 which is elevated to the broken line position on Figure 1 to receive the lower end of the oncoming continuous tube or cylinder P, and as the cylinder lengthens, the platform 14 lowers. This movement continues until the collar 34 engages the switch 35 to start the motor 18 to effect the rotating movement of the shaft 23 through the connections above described. About this time, the collar 33 will have engaged the lever 30 and may effect a slight movement of the linkage to cause the shaft 23 and associated parts to move slightly downwardly so that any downward movement of the platform 14 will not alter the desired length of the severed cylinder or pipe. After the cut has been made, both the pallet 13 and the cylinder are forced from the platform 14 by any suitable mechanism such as the ram H, and a fresh pallet is placed upon the platform which then raises to substantially the broken line position to receive the oncoming pipe. During such elevating movement of the piston rod 15, the collar 34 engages the underside of the lever 30 and returns the shaft 23 and mechanism R to the original position. Actually, when the cut is made by the mechanism R, there is no relative movement between the mechanism R and the pallet 13 or platform 14.

The cutter and rimmer mechanism R comprise a sleeve 36 which is keyed to the vertical shaft 23 and fixed to the upper portion of the sleeve 36 and extending horizontally therefrom is a bracket plate or carrier 37, on the upper side of which is pivotally mounted a knife arm 38, the same being pivoted at its inner end to the plate by the pivot 39. On the knife arm 38 is a knife plate 40 which has a longitudinally elongate slot 41 through which extend fasteners 42 connected to the arm 38. Integral with the plate 40 is an inverted C-shaped wedge-like blade having a blade portion 43 and a rearwardly inwardly curved blade end 44. On one edge portion of the carrier plate 37 is an upstanding stop flange 45 against which the knife arm abuts in its extreme outer position. Extending upwardly from the upper side of the carrier 37 adjacent the sleeve 36 is a lug 46 against which the knife arm 37 rests when the knife is in its inner or inoperative position, as shown by the broken lines on Figure 3.

Extending laterally in a forward direction from the knife arm 38 adjacent its outer end, is a rigid arm or cam finger 47 which has a rounded outer end portion. A helical coil spring 48 has one end connected to a pin on the upper face of the finger 47, extends about the sleeve 36, and has its opposite end secured to an anchor pin 49 on the upper side of the carrier 37. The spring 48 urges the knife arm 38 inwardly toward the upstanding lug 46 and holds the mechanism in its inoperative position so that when the shaft 23 is idle, the knife and rimmer mechanism R are resiliently retained in a position away from the wall of the cylinder P.

An elongate key 50 provides the operative connection between the shaft 23 and the sleeve 36 and, as shown particularly on Figure 10, the key enters an arcuate elongate keyway 51 formed in the wall of the sleeve 36 so that lost motion can take place between the shaft and the sleeve 36 for a purpose which will hereinafter appear. Superimposed upon the sleeve 36 is a collar 52 having a keyway to receive the key 50. However, no lost motion is afforded between the collar 52 and the shaft 23. On the collar 52 (Figure 8) is an integral laterally extending cam finger 53, the outer end portion of which is rounded.

The shaft 23 is driven in a counterclockwise direction as shown by the arrow on Figure 3, and as such rotation starts, the cam finger 53 first moves into engagement with the cam finger 47 to cam it substantially to the position shown on Figure 7, so that the knife is brought quickly into engagement with the inner wall of the cylinder P. Thereafter, the key 50 will have reached the end of the arcuate guideway 51 and drive the sleeve 36 and associated parts, whereupon by centrifugal force, the knife arm 38 and associated parts are forced out to the full position shown on Figure 3, gradually effecting the cut of the walls of the cylinder P.

Carried by the knife arm 38 are inside and outside rimmer tools for beveling or chamfering the inner and outer edge portions of the cylinder P following the cut effected by the knife blade. As shown, an inside rimmer 54 which constitutes a flat plate on the outer end of which is a U-shaped extension 55 which can project a distance inside of the inner edge of the cylinder P, and integral therewith are oppositely extending triangularly shaped blades 56, which are disposed on opposite sides of the plate, the upper blade chamfering or beveling the lower end of the continuous cylinder and the lower blade chamfering the upper end of the severed cylinder section. In the plate is an elongate slot 57 through which adjusting screws 58 extend for connecting the rimmer tool to the bracket plate 37 adjacent the stop flange 45. This enables the inside rimmer to be adjusted inwardly or outwardly relative to the bracket plate as required.

For rimming or chamfering the outer edge portions of the cylinder ends is an oscillatable shaft 59 arranged generally parallel to the inside rimmer plate and adjacent thereto, but disposed in advance thereof. The shaft 59 is mounted for oscillation in bearing brackets 60 and 61, the bracket 60 extending from the rear edge of the knife 43 and the bracket 61 being mounted upon the knife arm 38. The rimmer head is similar to that above described, in that it is of V shape except the arms of the V extend outwardly rather than inwardly as in the case of the inside rimmer (see Figure 5). The blades of the outer rimmer indicated at 62 are relatively narrow as compared to the inside rimmer blades, this being necessary so that the outside rimmer can be advanced to its working position through the cut formed by the knife blade 43.

The shaft 59 extends beyond the inner bearing bracket 61 and mounted on this inner end portion is a notched wheel 63 having notches 63a, 63b and 63c, as indicated on Figure 4, the notches 63a and 63b being adjacent each other and the notch 63c spaced substantially from the other notches. Mounted on the knife arm 38 is a detent in the form of a leaf spring 64, the free end portion of which is adapted to snap into one or the other of the notches 63a and 63b, depending upon the position imparted to the wheel 63. Fixed to the bracket plate 37 and projecting above the upper side thereof is a rigid pin 65 which engages in the notch 63c. This arrangement is such that in the inoperative position of the knife and rimmer mechanism R, the outer rimmer head 62 is disposed substantially in the plane of the knife 43. Substantially after the cut is made through the walls of the cylinder, the wheel fixed to the oscillatable shaft 59 is engaged by the pin 65 so that further movement of the knife arm imparts a rotary motion to the wheel 63, thereby turning the rimmer head 62 crosswise with respect to the knife blade or to the position shown on Figure 5. In this position, the outer rimmer can effect a chamfering or beveling of the outer walls both of the severed cylinder section as well as the oncoming or lower end of the cylinder.

After the cut has been made and the cylinder edges chamfered, this taking place after approximately one and one-half revolutions of the mechanism R, the shaft 23 stops, whereupon the spring 48 rocks the knife arm 38 to its inoperative position and in so doing, the wheel 63 is turned to bring the outer rimmer head 62 into the plane of the knife 43 as shown on Figure 7, thereby enabling the mechanism to retract to its inoperative position away from the walls of the cylinder, the spring 48 holding the carrier 37 against the stationary stop lug 46.

From the above description, it will be manifest that I have produced an exceedingly simple and efficient mechanism by which a continuous cylinder or tube of clay or other suitable material is formed and after a predetermined length has been produced, a section of the cylinder is severed from the remainder, and at the same time, the edges are beveled or chamfered, both the lower end of the oncoming cylinder, as well as the upper end of the severed cylinder section. The entire operation is substantially a continuous one, thereby lending it to large quantity production in a continuous, efficient and economical manner. Not only is the structure of the knife and rimmer mechanism R of importance due to its simplicity and efficient operation, but also the structure by which the lower end of the cylinder is pneumatically supported so as to yield with the oncoming length of cylinder without any liability of damage or injury to the cylinder which, of course, is at this time of relatively soft plastic material.

It is to be understood that numerous changes in details of construction, arrangement and operation may be effected without departing from the spirit of the invention especially as defined in the appended claims.

What I claim is:

1. Apparatus of the character described, comprising means for vertically forming a continuous tube of plastic clay-like material, support means for the lower end of the tube, means mounting said support means for up and down movement, said support means moving downwardly as the tube advances, normally inactive tube severing means, means mounting said severing means for up and down movement, mechanism for imparting limited downward movement to said tube severing means, and means responsive to predetermined downward movement of said support means for activating the tube severing means and substantially simultaneously actuating the mechanism so as to impart limited downward movement of the severing mechanism, the last named means operating so as to actuate the knife while continuing the downward motion of the tube severing means and tube.

2. Apparatus of the character described, comprising means for vertically forming a continuous tube of plastic clay-like material, support means for the lower end of the tube, means mounting said support means for up and down movement between relatively high and low positions, said support means moving downwardly as the tube advances, normally inactive tube severing means, means mounting said severing means for up and down movement between relatively upper and lower positions, mechanism for imparting limited upward and downward movement to said severing means, means moving with the support means for activating the tube severing means and substantially simultaneously actuating the mechanism so as to impart limited downward movement of the severing means from the upper to the lower position thereof in response to predetermined downward movement of the support means from the high to the low position thereof the last named means operating so as to actuate the tube severing means while continuing the downward motion of the tube severing means and tube, and means for actuating the mechanism so as to impart limited upward movement from the lower to the upper position thereof in response to predetermined upward movement of the support means from the low to the high position thereof.

3. Apparatus of the character described, comprising means for vertically forming a continuous tube of plastic clay-like material, support means for the lower end of the tube, means mounting said support means for up and down movement, said support means moving downwardly as the tube advances, a rotary drive shaft, means mounting said drive shaft within the tube for up and down movement, normally inactive drive means for rotating the drive shaft, normally inactive tube severing means mounted on said drive shaft and moving upwardly and downwardly therewith, means responsive to predetermined rotation of said drive shaft for activating said severing means, mechanism for imparting limited downward movement to said drive shaft, and means responsive to predetermined downward movement of said support means for activating the drive means and substantially simultaneously actuating the mechanism so as to impart limited downward movement of the severing mechanism, the last named means operating so as to actuate the knife while continuing the downward motion of the tube severing means and tube.

4. Apparatus of the character described, comprising means for vertically forming a continuous tube of plastic clay-like material, support means for the lower end of the tube, means mounting said support means for up and down movement, said support means moving downwardly as the tube advances, a rotary drive shaft, means mounting said drive shaft within the tube for up and down movement, normally inactive drive means for rotating the drive shaft, normally inactive tube severing means mounting said severing means on said drive shaft and providing limited lost rotative motion therebetween, means responsive to predetermined rotative motion of said drive shaft relative to said tube severing means for activating the latter, mechanism for imparting limited downward movement to said drive shaft, and means responsive to predetermined downward movement of said support means for activating the drive means and substantially simultaneously actuating the mechanism so as to impart limited downward movement of the severing mechanism, the last named means operating so as to actuate the knife while continuing the downward motion of the tube severing means and tube.

5. Apparatus of the character described, comprising means for vertically forming a continuous tube of plastic clay-like material, support means for the lower end of the tube, means mounting said support means for up and down movement, said support means moving downwardly as the tube advances, a rotary drive shaft, means mounting said drive shaft within the tube for up and down movement, normally inactive drive means for rotating the drive shaft, normally retracted radially extensible tube severing means, means mounting said severing means on said drive shaft and providing limited lost rotative motion therebetween, means responsive to predetermined rotative motion of said drive shaft relative to said tube severing means for extending the latter, mechanism for imparting limited downward movement to said drive shaft, and means responsive to predetermined downward movement of said support means for activating the drive means and substantially simultaneously actuating the mechanism so as to impart limited downward movement of the severing mechanism, the last named means operating so as to actuate the knife while continuing the downward motion of the tube severing means and tube.

6. In the combination claimed in claim 5, substantially flat V-shaped chamfering means for bevelling the exterior edges of the tube sections cut by said severing means, said chamfering means being mounted on the severing means for movement relative thereto between inactive and active positions, said chamfering means, in said inactive positions, being disposed with the V flatwise of the cut of said severing means and in the active position disposed with the V perpendicular to the cut of the severing means, means responsive to predetermined radially outward movement of said severing means from the retracted to the extended position for moving said chamfering means from said inactive to said active position, and means responsive to radially inward movement of said severing means from the extended to the retracted position for moving the chamfering means from the active to the inactive position.

7. The combination claimed in claim 6, and means fixed on said severing means and moving therewith for chamfering the inside edges of the tube sections concomitantly with the severing operation.

References Cited in the file of this patent

UNITED STATES PATENTS

| 126,929 | Brown | May 21, 1872 |
| 1,547,959 | Roth | July 28, 1925 |
| 1,651,203 | Hibbins | Nov. 29, 1927 |
| 1,850,327 | Makowski | Mar. 22, 1932 |
| 1,978,420 | Dyer | Oct. 30, 1934 |
| 2,480,442 | Booth | Aug. 30, 1949 |
| 2,497,724 | Gilson et al. | Feb. 14, 1950 |
| 2,528,114 | Cerruti | Oct. 31, 1950 |
| 2,544,254 | Child, Jr. | Mar. 6, 1951 |
| 2,630,613 | Webb | Mar. 10, 1953 |
| 2,636,625 | Pries | Apr. 28, 1953 |
| 2,645,835 | Bennett et al. | July 21, 1953 |